Nov. 26, 1957 A. J. HUGHES 2,814,521
SELF-LOCKING CARGO CARRIER HOOK
Filed Jan. 16, 1956
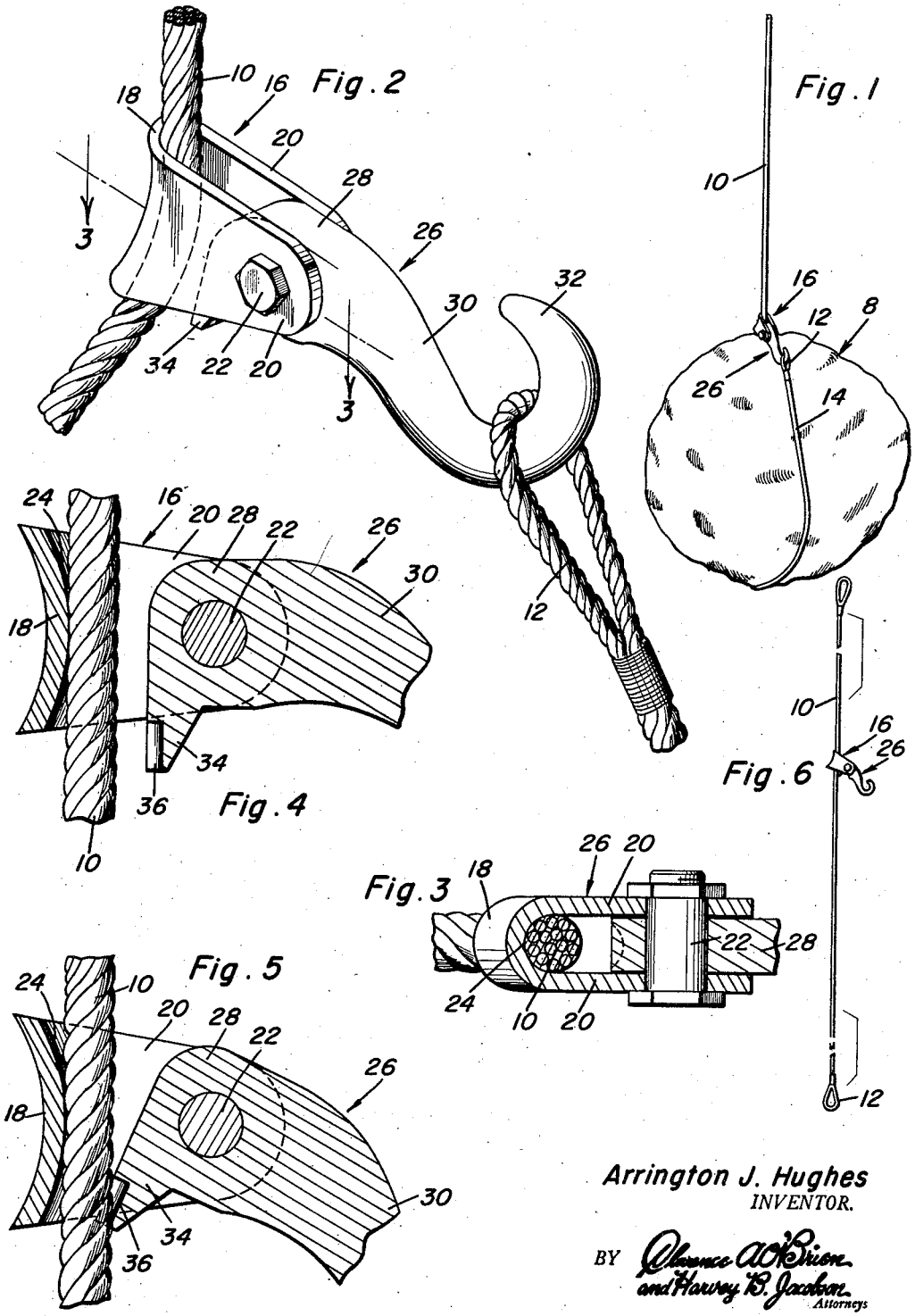
Arrington J. Hughes
INVENTOR.

United States Patent Office 2,814,521
Patented Nov. 26, 1957

2,814,521

SELF-LOCKING CARGO CARRIER HOOK

Arrington J. Hughes, Selma, Calif.

Application January 16, 1956, Serial No. 559,346

2 Claims. (Cl. 294—74)

The present invention relates to a self-locking hook which is usable on and in connection with a wire rope, sling, cable or the like which is, in turn employed to embrace and life and lower relatively large loads and objects.

As is perhaps self-evident from a general survey of the views of the accompanying sheet of drawings the hook is a type which is employed in heavy construction work for the lifting of large objects such as boulders and the like and which is used in conjunction with a cable which, in turn, is attached to the hook for pulling and lifting up the stated load or object from one elevation to another. As will be hereinafter evident the hook, which is characterized by a clevis between the arms of which the shank of the hook proper is fastened, is so constructed that a detent on the pivoted shank is angled and engageable with the surface of the cable or other line at the time that the hook is not in use. Therefore it is the object and purpose of the invention to render the hook "self-locking" so that it will stay in a handy or accessible position and will not slide down the line to a point completely out of reach of the user thereof.

Manifestly, it is common practice to form a loop on one end of the wrap-around line or cable and to join it to the cable proper by way of a pivoted hook, that is, a hook the shank of which is pivoted on a sliding clevis and the clevis being slidably attached to the line. The ordinary construction, however, is such that the hook and clevis as an assemblage will slide down the line and sometimes be competely detached from the line. Therefore, the objective here is to so construct the pivoted shank portion of the hook that a lug-like extension thereon constitutes a detent and bites into the surface of the line to thus friction-hold the hook and its clevis is a self-retaining position on the line.

Other objects, features and advantages will become more readily apparent from the following description and accompanying sheet of illustrative drawings.

In the drawings, wherein like numerals are employed to designate like parts throughout the views:

Figure 1 is a perspective view showing the loop-equipped end of a cable or hoistening line wrapped around a load and engaged with the improved hook;

Figure 2 is an enlarged fragmentary perspective view with the load removed and showing the manner in which the self locking detent or dog functions in a released manner when it is in load supporting use;

Figure 3 is a section, with parts in elevation, on the line 3—3 of Figure 2 looking in the direction of the arrows;

Figure 4 is an exaggerated detailed section showing the dog in its released position;

Figure 5 is a view in section similar to Figure 4 showing how the dog functions when it is caused by the weight of the hook itself to angle itself and bite into the line; and Figure 6 is a small view showing a foreshortened length of lifting or hoisting cable similar to that seen in Figure 1 and illustrating in particular how the "self-locking" idea is carried out.

Referring now to the drawings and in particular to Figure 1 the numeral 8 designates a load. This may be any comparatively unwieldy, heavy or similar object which has to be either raised or lowered and which is maneuvered with the aid of a cable or line which is looped in sling fashion around the same as illustrated. The expression "line" is used here to designate any cable, rope or other flexible element and it is denoted by the numeral 10. There is a loop 12 on the lower or free end portion 14. This is connected with the line proper in a well known manner by means of a hook device. The device here shown, which is similar to those commonly used, is characterized by a substantially U-shaped yoke or clevis and this is denoted by the numeral 16 and comprises a bight portion 18 and a pair of spaced parallel arms 20 carrying a bolt 22. If desired the bight portion may be of arcuate form to provide a crest or bend as at 24 in Figure 4 to slidingly engage the surface of the cable with requisite effectiveness. The hook itself is denoted as a unit by the numeral 26 and it is of course joined by way of the clevis to the cable. To this end the bolt 22 is passed through the arms and through the relatively heavy head portion 28 on the shank 30. The outer end of the shank terminates in the customary beak or bill portion 32 with which the aforementioned loop 12 is engaged. In this arrangement the headed pivoted end of the shank is provided with an outstanding or laterally disposed substantially V-shaped lug 34 one surface of which is grooved as at 36 whereby said lug becomes a self-locking dog or detent when it is angled from the released position seen in Figure 4 to the bound locking position seen in Figure 5. With this construction the clevis slides up and down as usual but when the load is off the hook the lug automatically comes into its self-locking position. The weight of the hook itself accomplishes this.

It will be evident that the gist of the invention is to provide, in combination, a hook construction which is characterized by a clevis and a pivoted bill-type hook carried by the arms of the clevis. Manifestly the objective as already touched upon is to have hook means which is designed to eliminate falling or slipping of the hook to the end of the sling or line as is the situation with similarly constructed and performing hooks in current use. Or to state it otherwise this hook is not designed to carry any load in its locked position. Its purpose is to hold its own weight so that it will not slip along the cable when it is not in use. The useful position is seen in Figure 1 and the self-locking position is seen in Figure 6 and these views in conjunction with the other views and the detailed description would seem to be sufficient to comprehend the construction and significant aspects of the invention.

What is claimed as new is as follows:

1. In combination, a flexible sling, an end portion of which is adapted to embrace the load for lifting and lowering the load in a generally well-known manner, said sling embodying a flexible line and said line terminating in a loop, a substantially U-shaped clevis slidable along said line and embodying a bight portion having sliding contact with the line and arm portions projecting in spaced parallelism beyond the line at a side diametrically opposite to the side contacted by said bight portion, a self-locking hook embodying a shank formed at its inner end with a head arranged and pivotally mounted between the arms of said clevis and its outer end with a bill portion with which said loop is releasably engageable, said head being provided on that portion of its marginal edge which is adjacent to said bight portion with a radially projecting lug and said lug constituting a hook-locking dog and being manually and intentionally engageable with the cooperating portion of the line when the lug is swung toward the line and into an oblique angled position between said arms the combined weight of the shank and bill portions being proportional to the weight of the head and lug that the forces of gravity function in automatically swinging the lug upwardly into hook-locking position.

2. For use in conjunction with a load hoisting and lowering line, a self-locking hook construction comprising a substantially U-shaped clevis adapted to be slidably mounted on said line, said clevis having a bight portion and spaced parallel arms adapted to straddle and extend well beyond said line, a hook embodying a shank with a hooked bill portion at the outer end of the shank and a head portion at the inner end of the shank, said hooked bill portion being heavy but adapted to accommodate the usual terminal loop on said hoisting line when the latter is used in the form of a sling, said head being confined and pivotally mounted between free end portions of said arms and having that portion of the marginal edge which is adjacent to said bight portion formed with an integral lug projecting radially beyond said marginal edge and partially confined between and angled toward said bight portion when it is in its self-locking line engaging position and projecting below the lower edge portions of the arms when it is released and readied to be used in making up said sling, the mass of the shank and bill portions of said hook being such that said lug is adapted to swing automatically in an arcuate path in a manner to cause the lug to approach the bight portion of the clevis in an approximately oblique angled position in order to engage itself releasably with the line.

References Cited in the file of this patent

UNITED STATES PATENTS

| | | |
|---|---|---|
| 1,627,733 | Fritts | May 10, 1927 |
| 2,381,531 | Ehmann | Aug. 7, 1945 |
| 2,416,733 | Berndt | Mar. 4, 1947 |
| 2,611,638 | Meighan | Sept. 23, 1952 |

FOREIGN PATENTS

| | | |
|---|---|---|
| 612,901 | Great Britain | Nov. 19, 1948 |